United States Patent [19]

Matsuura

[11] 3,990,227

[45] Nov. 9, 1976

[54] CONSTRUCTION OF THE STACKED BASE PLATES FOR THE TIMEPIECE

[75] Inventor: Eiichi Matsuura, Chiba, Japan

[73] Assignee: Kabushiki Kaisha Daini Seikosha, Japan

[22] Filed: Dec. 24, 1974

[21] Appl. No.: 536,205

[30] Foreign Application Priority Data

Dec. 25, 1973 Japan .................................. 49-3979
Dec. 28, 1973 Japan ............................ 49-2585[U]

[52] U.S. Cl. ................................ 58/104; 151/41.71
[51] Int. Cl.[2] .................... G04B 29/02; F16B 39/00
[58] Field of Search ..................... 58/104; 151/41.71

[56] References Cited

UNITED STATES PATENTS 527,771 10/1894 Church ................................ 58/104
2,253,763 8/1941 Colomb ................................ 58/104

FOREIGN PATENTS OR APPLICATIONS 228,988 12/1943 Switzerland ........................... 58/104

*Primary Examiner*—Edith Simmons Jackmon
*Attorney, Agent, or Firm*—Robert E. Burns; Emmanuel J. Lobato; Bruce L. Adams

[57] ABSTRACT

A construction of stacked base plates for a timepiece comprises: a plurality of base plates connected together by calking pins. A portion of one of the calking pins functions as a pivot portion or guide portion for a movable spring member which is mounted on one base plate. Other areas of said base plates are connected by screw bolts so that said base plates are rigidly connected together by said calking pins and screw bolts.

7 Claims, 10 Drawing Figures

FIG. 1
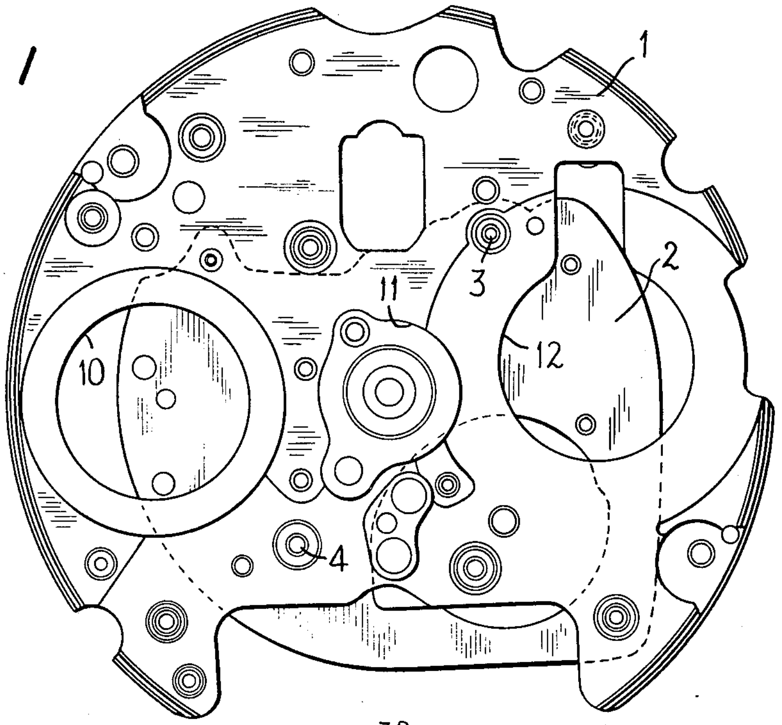
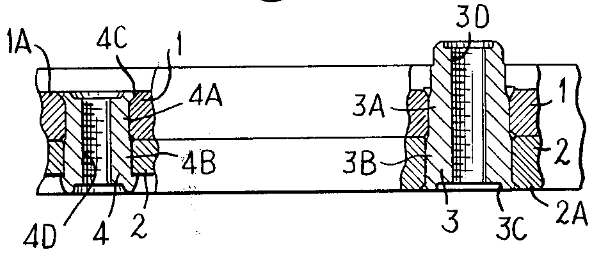
FIG. 3
FIG. 2
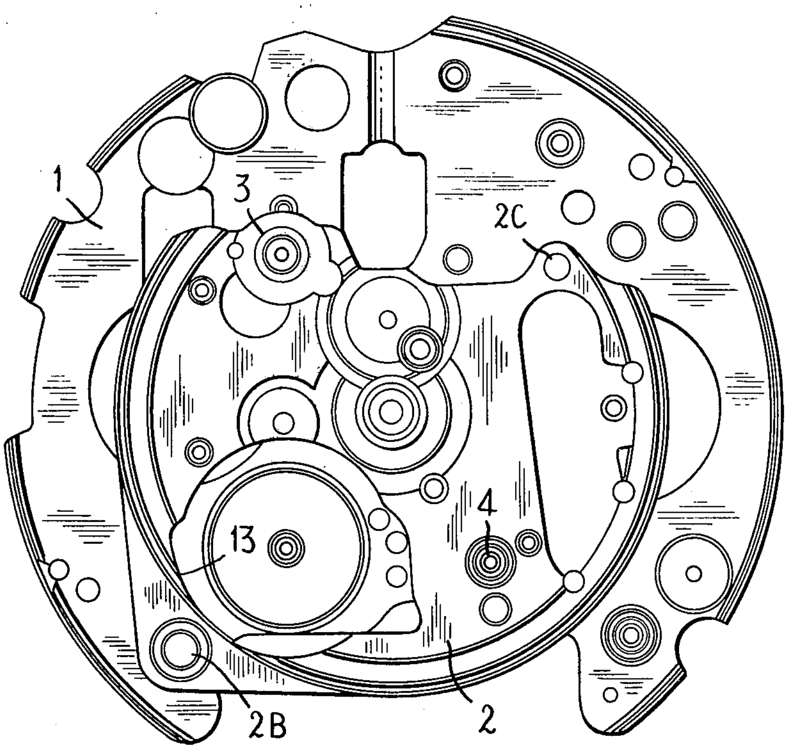
FIG. 4A
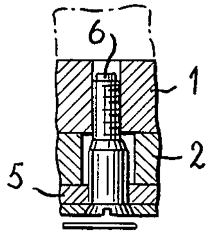
FIG. 4B
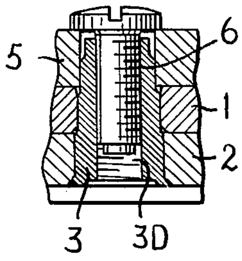

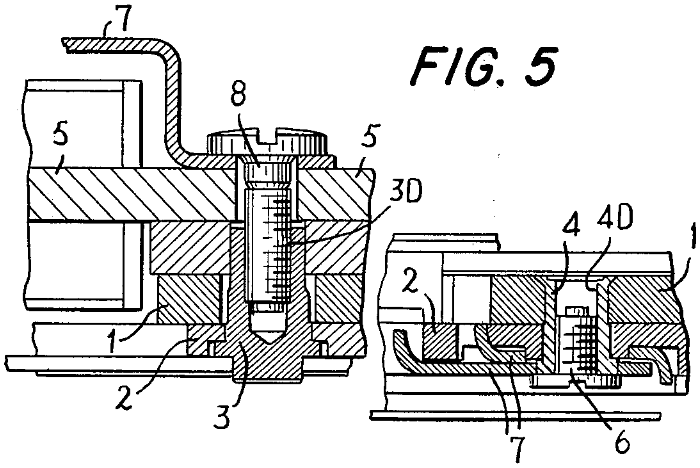
FIG. 5
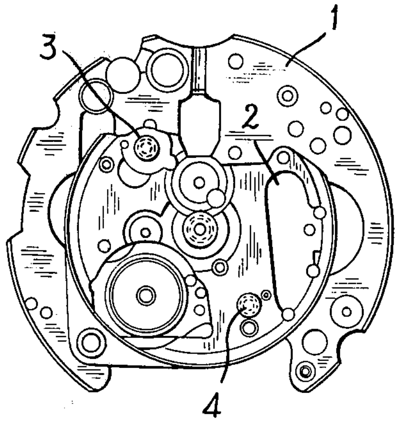
FIG. 6
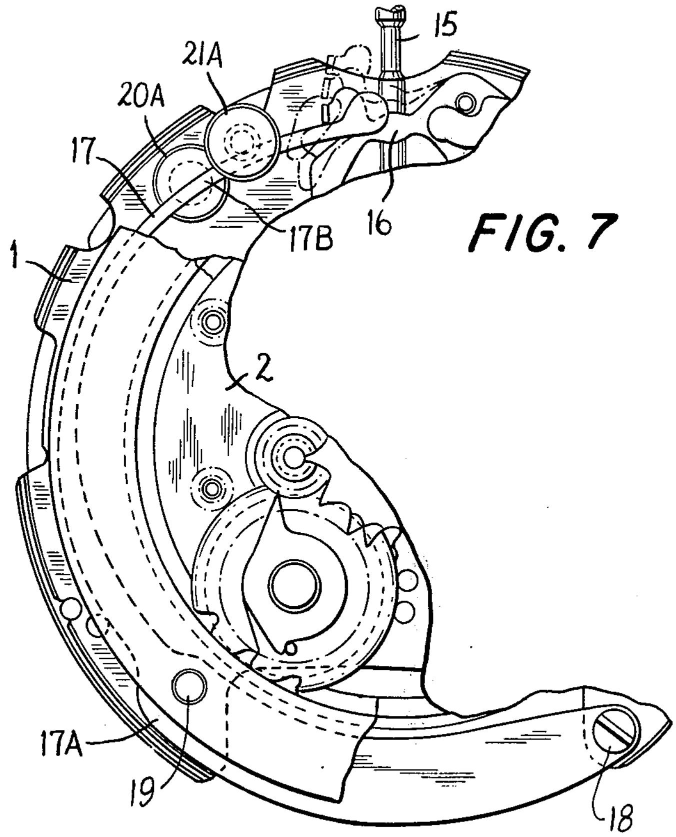
FIG. 7
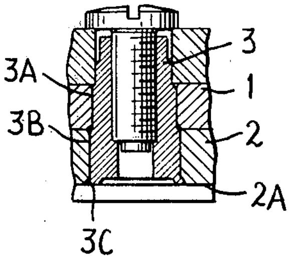
FIG. 9
FIG. 8
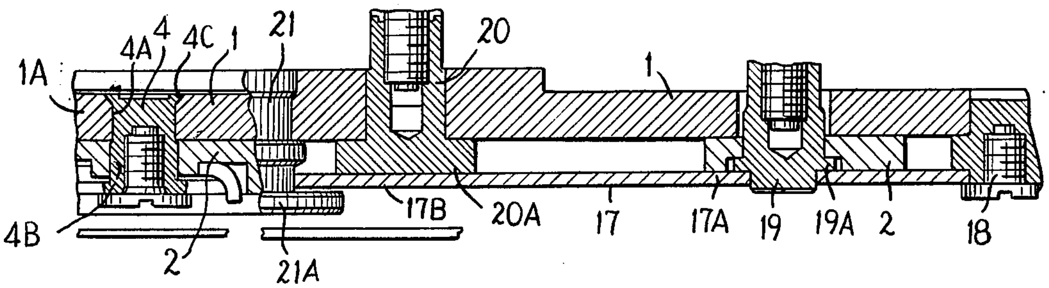

CONSTRUCTION OF THE STACKED BASE PLATES FOR THE TIMEPIECE

BACKGROUND OF THE INVENTION

In the conventional type of the timepiece, the timepiece base plate is made of thick sheet metal so that the cost of milling the needed recesses in the base plate is very high.

Alternatively, the recesses can be formed by using a machine tool though this technique is also costly as it necessitates the pre-manufacturing of the holes.

It is also known in the art to use a plurality of base plates though engineering difficulties have been encountered in terms of simplicity of construction, manufacturing cost and in obtaining a base plate assembly of acceptable strength.

OBJECT OF THE INVENTION

The present invention aims at eliminating the above-noted drawbacks and therefore, it is the primary object of the present invention to provide a plurality of timepiece base plates which are combined together by coupling means comprised of calking pins and screw bolts.

Another object of this invention is to form a part of the coupling means as a pivot portion or guide portion for a movable spring member which is mounted on said base plate.

SUMMARY OF THE INVENTION

According to the present invention, a plurality of timepiece base plates are connected together by coupling means comprising in part, calking pins, and in part, screw bolts, A part of said coupling means is used as a pivot portion or guide portion for a spring member which is mounted on said base plate.

BRIEF DESCRIPTION OF THE DRAWINGS

The above-mentioned and further objects, features and advantages of the present invention will become more apparent from the following description when taken in connection with the accompanying drawings, which show preferred embodiments of the invention, and wherein:

FIG. 1 and FIG. 2 show a plan view and a bottom view of a plurality of base plates according to this invention;

FIG. 3 to FIG. 5 respectively show in cross section the parts shown in FIGS. 1 and 2 cipal part in this embodiment;

FIG. 6 and FIG. 7 respectively show a plan view of another embodiment this invention; and, FIG. 8 and FIG. 9 respectively show in the parts shown in FIGS. 6 and 7 enlarged cross section.

DETAILED DESCRIPTION OF THE INVENTION

Referring now to the accompanying drawings, one embodiment of this invention will be explained and this embodiment is directed to the construction of stacked base plates for a timepiece having a first base plate 1 and a second base plate 2, these plates 1 and 2 being combined by a set of calking pins 3 and 4.

As seen in FIG. 3, the pin 3 has a tubular configuration which is internally threaded and has on its exterior a small diameter portion 3A and a large diameter portion 3B which are respectively inserted with a force fit into holes in said first and second base plates 1 and 2. Said pin 3 is calked to the lower surface 2A of said second base plate 2 and made tight against leakage by an annular calking portion 3C. In a similar manner, the pin 4 has a tubular shape whose interior is threaded and whose exterior has a small diameter portion 4A and a large portion 4B which are respectively inserted with a force fit into holes in said first and second base plates 1 and 2, and said pin 4 is calked to the upper surface 1A of said first base plate 1. The first and second base plates 1 and 2 are thus secured together by the above-mentioned means to form a rigid base plate assembly.

As seen in FIGS. 4(A) and 4(B) and FIG. 5, another component or member 5 of the watch movement is attached by threading screw bolts 6 in the screw holes 3D and 4D of said pins 3 and 4 so that said first and second base plates are firmly secured to said other member 5.

The other areas of the base plate 2 excepting the areas adjacent said pins 3 and 4, for example, the left underside and right upper side of said base plate 2 in FIG. 2, are attached to the base plate 1 and another member 7 by a set of screw bolts 8.

According to the invention, it is not necessary to recess the hole located at the connecting face between said first base plate 1 and second base plate 2, and instead of forming plural recesses, through-holes 10, 11 12 and 13 of said base plates are used thereby simplifying the manufacturing process of said base plates as the recess need only be formed in one face of said base plate.

Now, referring to another embodiment of the invention as portrayed in FIG. 6 to FIG. 9, a first base plate 1 is connected to a second base plate 2 by tubular coupling pins 3 and 4. The exterior of the pin 3 has a small diameter portion 3A and a large diameter portion 3B which are respectively inserted into holes in the base plates 1 and 2, said pin 3 being calked to the lower portion 2A by an annular calking portion 3C. Similarly, the exterior of the pin 4 has a small diameter portion 4A and a large diameter portion 4B which are respectively inserted into holes in the base plates 1 and 2, said pin 4 being calked to the upper portion 1A by a calking portion 4C, the connection of said first and second base plates 1 and 2 being attained by the above-mentioned means.

As seen in FIG. 7 and FIG. 8, a spring member 17 exerts a certain spring force on a lever 16 which is pivoted to predetermined positions in response to axial displacement of a winding stem 15. The lower portion 17A of the spring member 17 is mounted on the base plate 1 by a screw bolt 18 and a coupling calking pin 19 thereby determining the position of said spring member 17 on said base plates.

The end portion 17B of the spring member 17 is positioned to engage said lever 16 and exert thereon a certain spring force. The spring member 17 abuts the lower face 20A of a steady pin 20 and the portion 17B of said spring member 17 is constrained from moving laterally, i.e., downwardly in FIG. 8 about the bolt 18, by the flange 21A of a pin 21.

Therefore, the extent of lateral or floating movement of said spring member 17 in one direction is controlled by said screw bolt 18 and the flange 21A of said pin 21, and the extent of lateral movement in the other direction of said spring member 17 is controlled by the flange portion 19A of said pin 19 and the lower face 20A of said steady pin 20.

The horizontal or axial lengthwise movement of said spring portion 17B of said spring member 17 is permitted within a certain range of movement by said flange 21A of said pin 21 so that the spring force can be exerted on said lever 16 during movement of spring member within said certain range. According to the invention as above-mentioned, the coupling pin 19 and the steady pin 20 are used as a guiding support for guiding and defining the path of movement of the spring member 17 and the bottom of said steady pin functions as a rest for the spring member thereby reducing the cost and simplifying the manufacturing process.

What is claimed is:

1. In a timepiece of the type having an axially displaceable winding stem: a plurality of superposed base plates; coupling means coupling together said base plates to form a rigid base plate assembly, said coupling means comprising a set of calking pins each inserted with a force fit into aligned holes in said base plates thereby connecting said base plates together, and a set of screw bolts threadedly connecting together said base plates; means mounted on said base plate assembly for exerting a spring force on said winding stem biasing said winding stem in one axial direction, said means including a pivotable lever engageable with said winding stem, and an elongated spring member mounted on said base plate assembly so as to exert a spring force on said lever to thereby bias said winding stem in said one axial direction; and means including a part of said coupling means for guiding the movement of said spring member.

2. A timepiece according to claim 1; wherein said part of said coupling means includes one of said calking pins which has a flange portion, and said spring member has an opening through which is inserted said calking pin such that its flange portion abuts with said spring member.

3. A timepiece according to claim 1; wherein said means for guiding the movement of said spring member comprises means mounting said spring member on said base plate assembly for lateral floating movement relative to said base plate assembly, and means including a part of said coupling means for guiding and controlling the extent of said lateral floating movement.

4. A timepiece according to claim 3; wherein said means mounting said spring member comprises means attaching one end of said spring member to said base plate assembly so as to permit said spring member to undergo lateral floating movement about its point of attachment, and said means including a part of said coupling means for guiding and controlling the extent of lateral floating movement comprises a plurality of pins connected to said base plate assembly and spaced along the length of said spring member and having pin portions engageable with opposite sides of said spring member to guide and control the extent of said lateral floating movement.

5. A timepiece according to claim 4; wherein said means attaching one end of said spring member comprises a screw bolt threaded into said base plate assembly.

6. A timepiece according to claim 1; wherein said calking pins have a tubular shape having on their exterior a large diameter portion and a small diameter portion which fit snugly into respective large and small diameter holes in said base plates.

7. A timepiece according to claim 6; wherein said tubular calking pins have threaded interiors to receive threaded screw bolts thereby providing means for attaching other components of the timepiece to said base plate assembly.

* * * * *